Jan. 10, 1967 A. BENCHIMOL 3,297,937
FREQUENCY CONVERTER UTILIZING MAGNETIC AMPLIFIERS AND SCR'S
Filed Feb. 13, 1963 4 Sheets-Sheet 1

INVENTOR.
AUGUSTO BENCHIMOL
BY Gordon Wood.
ATTORNEY

Jan. 10, 1967 A. BENCHIMOL 3,297,937

FREQUENCY CONVERTER UTILIZING MAGNETIC AMPLIFIERS AND SCR'S

Filed Feb. 13, 1963 4 Sheets-Sheet 2

INVENTOR.
AUGUSTO BENCHIMOL
BY Gordon Wood.
ATTORNEY

INVENTOR.
AUGUSTO BENCHIMOL
BY Gordon Wood
ATTORNEY

INVENTOR.
AUGUSTO BENCHIMOL
BY Gordon Wood
ATTORNEY 3,297,937
FREQUENCY CONVERTER UTILIZING MAGNETIC AMPLIFIERS AND SCR's
Augusto Benchimol, Rio de Janeiro, Brazil
Filed Feb. 13, 1963, Ser. No. 258,220
6 Claims. (Cl. 321—60)

This invention relates to frequency converters, and more particularly to circuits to control the frequency of an alternating current supply for use in such devices as large spot-welding machines.

Existing frequency conversion circuits for spot-welders ordinarily employ a delta circuit energized by a three-phase power supply line. In each leg of the delta is connected, in series, a pair of gaseous discharge valves in antiparallel arrangement and one of the primaries of a power transformer. The output transformer therefore has three separate primary windings, and a single secondary to which is connected the spot-welder. Examples of such circuits may be seen in U.S. Patents Nos. 2,431,083 to Sciaky, 2,600,519 to Solomon, 2,704,820 to Martin and 2,431,240 to Bivens. In addition to the more-or-less common power circuit, these patents show various types of control circuits for timing the operation of the power circuit.

There are two disadvantages, however, in this type of frequency conversion system: first, the gaseous discharge valves are inefficient and unreliable, and since they must handle the full load of the power circuit are also large and expensive; second, the means disclosed in all of these patents to control the power circuit involve extremely complex systems phased and synchronized to the line voltages with the result that the control circuit becomes almost as expensive and unreliable as the power circuit.

The primary object of the present invention is therefore to provide new types of frequency conversion circuits having a power circuit of improved efficiency, reliability, compactness and economy.

A further object of the invention is the provision of a novel type of control circuit especially adapted to control the type of frequency converting power circuit herein disclosed, for spot-welders. This control circuit is extremely simple and can be built entirely out of commercially available component circuits.

A further object of the invention is to connect the elements in this power circuit in such a way that they may be sequentially controlled by a simple type of series circuit not requiring phasing or multiple synchronization with the power line voltages, for continuous operation.

Figure 1A:
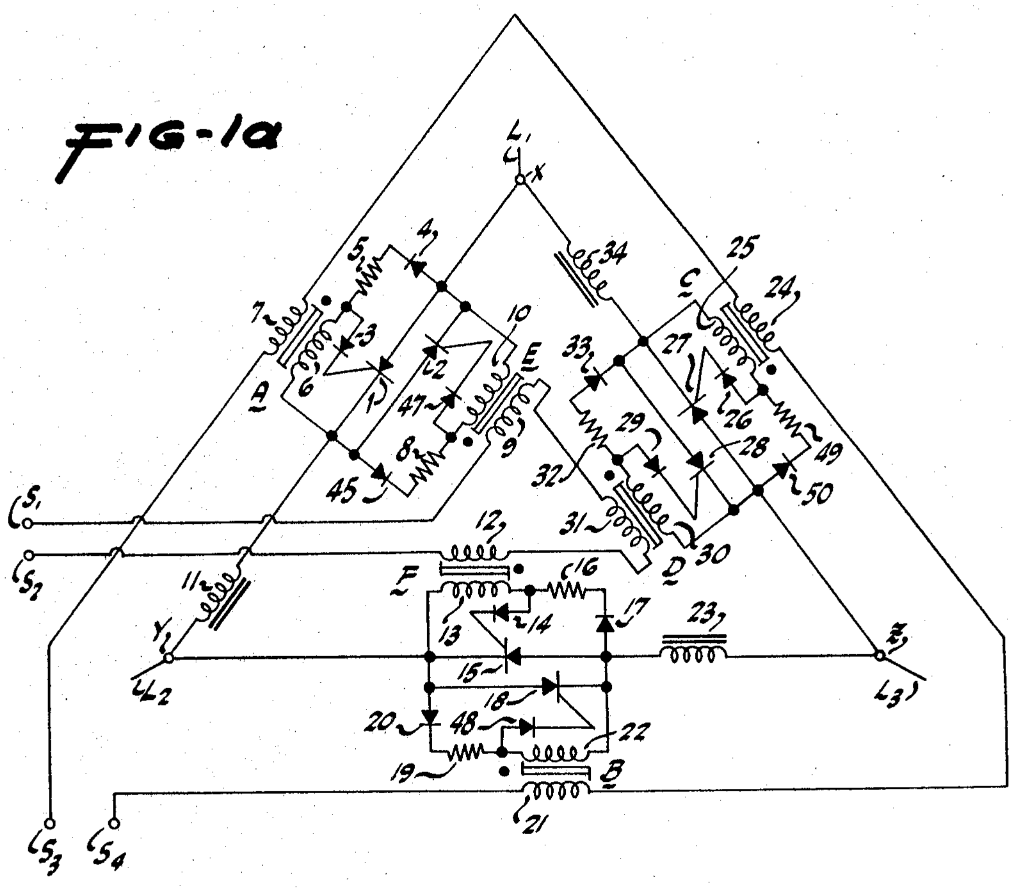
Figure 1B:
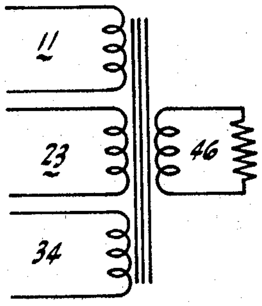

Objects and advantages in addition to those above will be apparent from the following description relating to the accompanying drawings, in which:

FIG. 1*a* diagrammatically illustrates a delta-connected power circuit of a frequency converter embodying the invention;

FIG. 1*b* diagrammatically shows the power output transformer for the circuit of FIG. 1*a*.

Figure 1C:
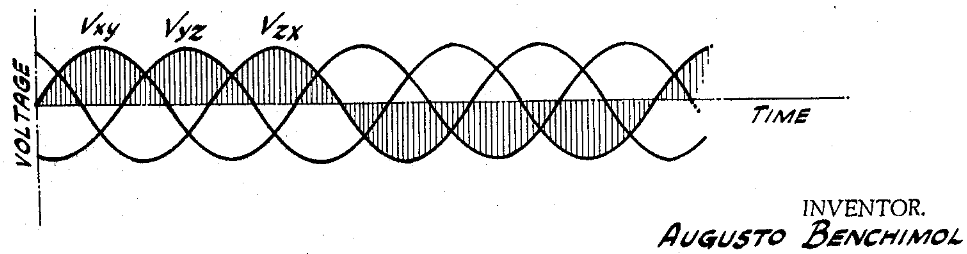

FIG. 1*c* is a graph of the voltages impressed on the circuit of FIG. 1*a* as a function of time, with shading added to show the voltage applied to the primaries of the transformer of FIG. 1*b* as a result of the frequency control.

Figure 2A:
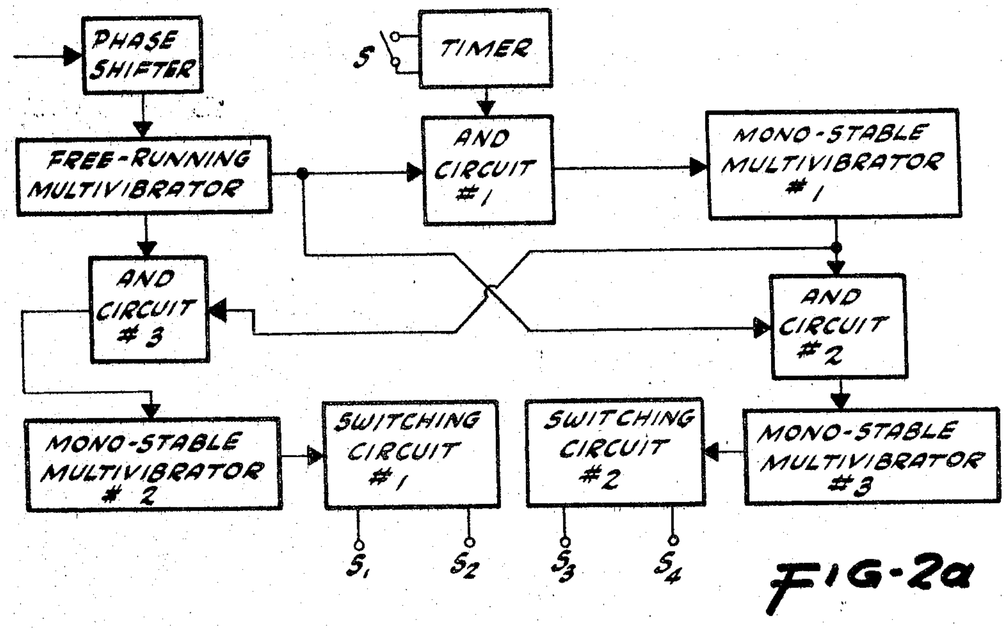

FIG. 2*a* shows a block diagram of a control circuit adapted to control the type of power circuit disclosed in FIG. 1*a*.

Figure 2B:
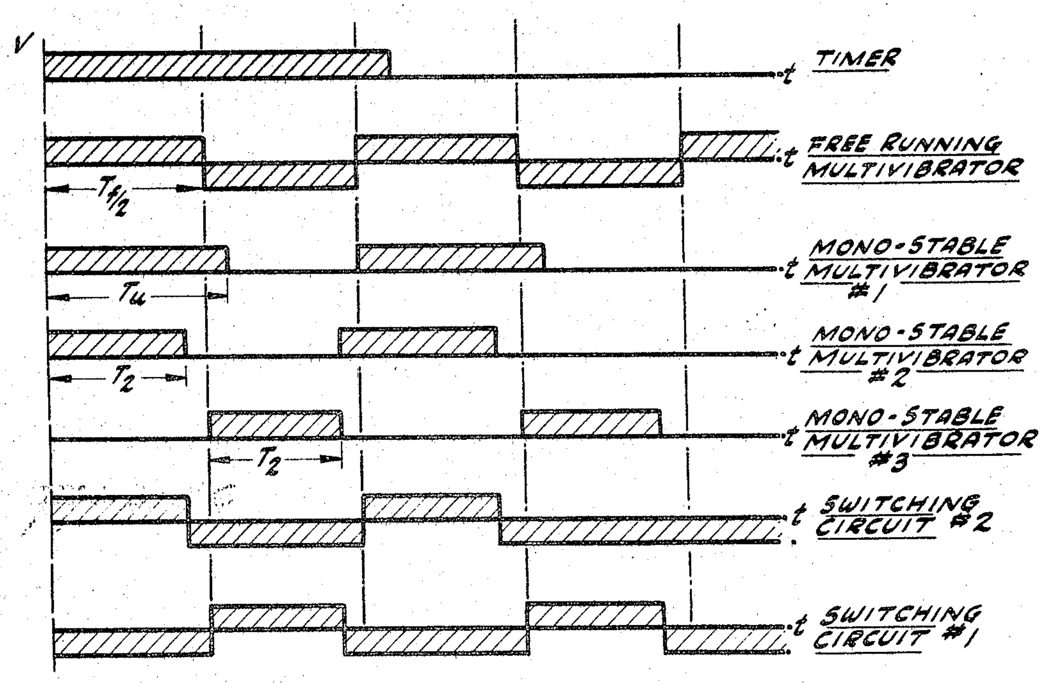

FIG. 2*b* shows a graph of the voltage output as a function of time for the various elements of FIG. 2*a*.

Figure 3A:
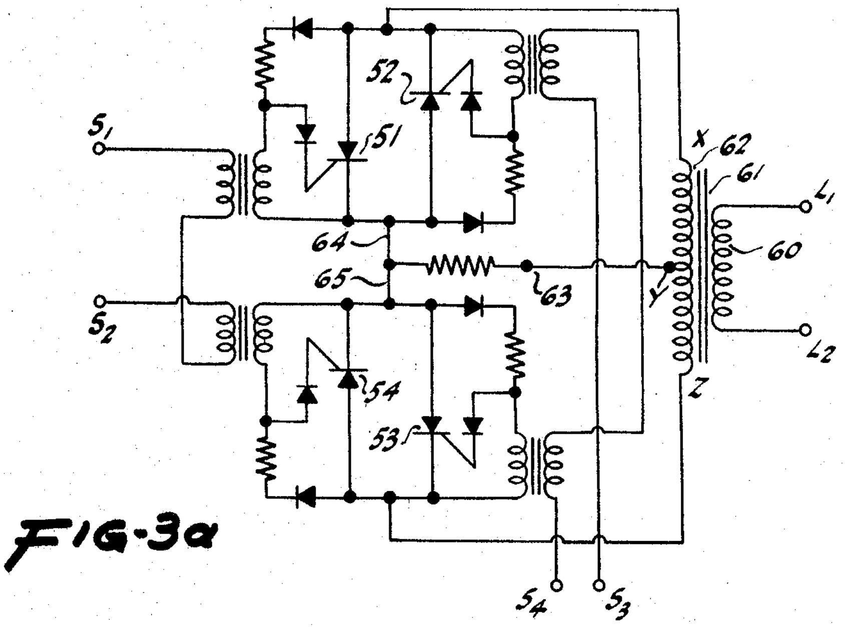

FIG. 3*a* diagrammatically illustrates a modification of the circuit of FIG. 1*a* to adapt it to single phase power supply.

Figure 3B:
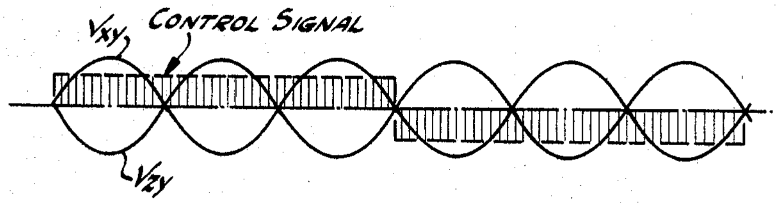

FIG. 3*b* is a graph of the voltages impressed on the circuit of FIG. 3 as a function of time, and also shows in broken line an example of a typical control signal such as would be received from a circuit such as that of FIG. 2*a*. Shading has also been added to show the full-wave form of the resultant voltage across the load.

Figures 4A, 4B:
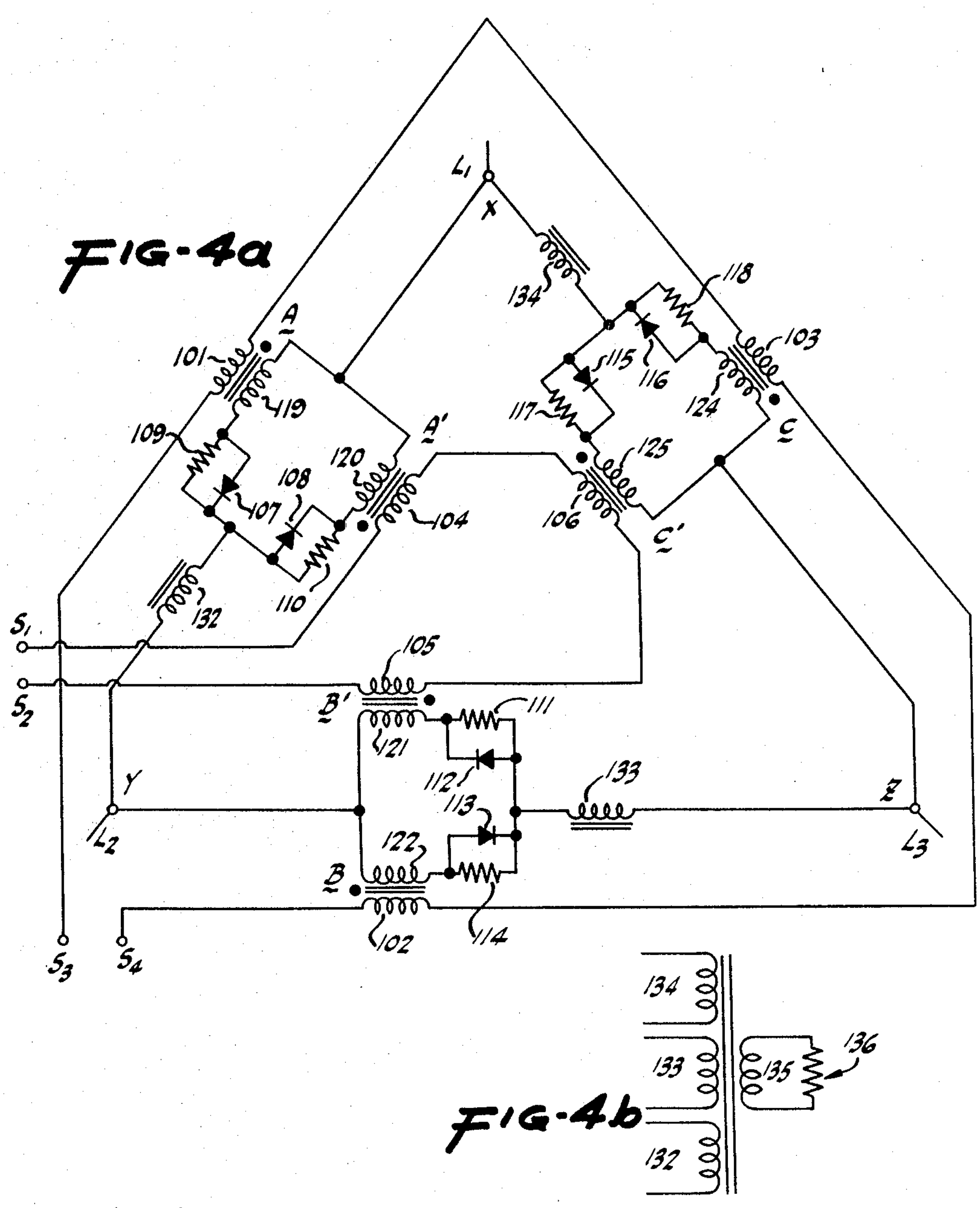

FIG. 4*a* diagrammatically illustrates another modification of the circuit of FIG. 1*a*.

FIG. 4*b* diagrammatically illustrates the power output transformer for the circuit of FIG. 4*a*.

Figure 4C:
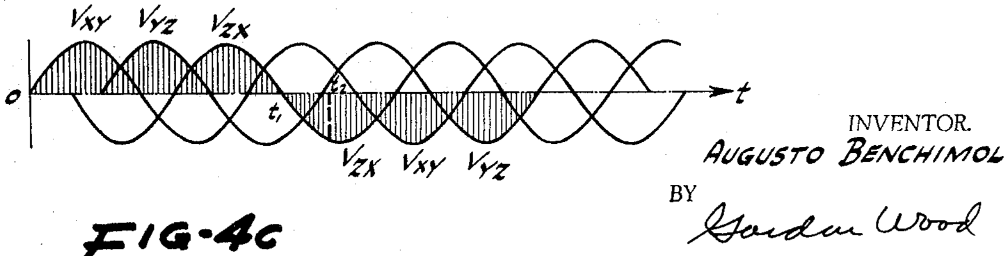

FIG. 4*c* is a graph showing the voltages across each of the three primary windings of the transformer of FIG. 4*b*.

Figure 5:
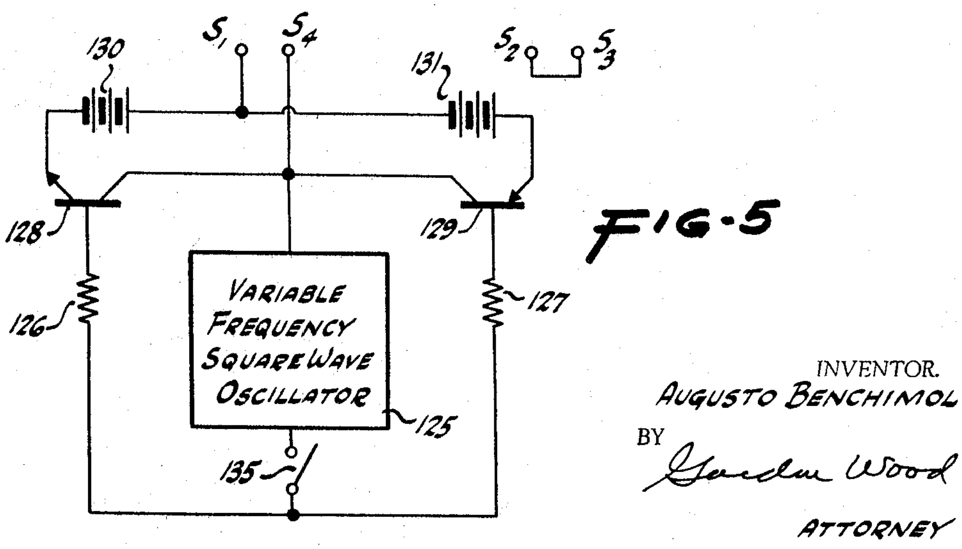

FIG. 5 illustrates diagrammatically a modified control circuit for use in place of the circuit of FIG. 2*a* to control the frequency of the power circuits of FIGS. 1*a*, 3*a* or 4*a* for continuous operation, as for driving an alternating current motor.

The construction and operation of my invention may be summarized as follows:

Frequency conversion is accomplished in a characteristic power circuit embodying my invention, FIG. 1*a*, by sequentially firing the silicon-controlled rectifiers 1, 18 and 27 (from now on designated SCR's) and then 2, 28 and 15 consecutively. Firing is accomplished by means of six magnetic amplifiers each constituted by a magnetic core and two windings, called here the gate winding 6 and control winding 7 for SCR 1.

Across each SCR shown in FIG. 1*a*, there is a similar circuit which, for SCR 1, is constituted by a diode 4, a limiting resistor 5 and the gate winding 6 of magnetic amplifier A. The gate electrode of SCR 1 is connected to the dotted side of the gate winding through a diode 3 used here to prevent excessive peak inverse voltages between cathode and gate electrode of the SCR 1.

In order to fire a silicon controlled rectifier, a certain current must be injected in the gate electrode when the anode is positive in relation to the cathode. In the system presented in FIG. 1*a* let us assume that a certain instant of time voltage $V_{xy}$ between lines $L_1$ and $L_2$ is growing positively ($x$ positive in relation to $y$). If core A is saturated in its positive direction (towards the dot) the gate winding will not be able to sustain any voltage and if the resistance of the winding is made negligible in relation to the input impedance of the gate electrode, this gate winding will act as a short circuit, and consequently the SCR will not fire.

On the other hand if we assume that the core is saturated in the negative direction (away from the dot) once the voltage from $x$ to $y$ starts growing positively the magnetic flux state of the core will start reversing and the gate winding will support a voltage. The voltage across this gate winding increases at the same rate as the voltage $V_{xy}$ and since it is shunted across the input of the gate electrode of the SCR a current limited only by resistor 5 (for SCR 1) will be injected into the gate cathode input. When the value of this current reaches a certain limit, the SCR will fire. The voltage from anode to cathode falls to a very low value (forward voltage drop) forcing the current through the gate circuit to decrease to a negligible level.

From this explanation it is seen that in order to fire an SCR of the circuit of FIG. 1*a* the corresponding magnetic core must be in a state of negative flux saturation. This state however depends on the polarity of the signal applied to the reset or control winding of the magnetic core.

In the circuit of FIG. 1*a*, the control windings of cores A, B and C are connected in series. The same is true for the control windings of cores D, E and F. When the system is in operation, these two groups of control windings are energized from two different switching circuits such that the magnetic state of cores A, B and C are opposite to the magnetic states of cores D, E and F. Whenever cores A, B and C are in the negative state of saturation (away from the dot) SCR's 1, 18 and 27 will be firing sequentially as the voltages $V_{xy}$, $V_{yz}$ and $X_{zx}$ (FIG. 1*c*) become positive and reach the commutating angle of the three phase system.

It will be understood that only one operation of each SCR need be described in detail. In FIG. 1*a* diode 47 corresponds to above described diode 3; diode 45 corresponds to diode 4, and resistor 8 corresponds to resistor 5.

Furthermore, all of the various elements in each leg of the delta connected power circuit need not be described in detail. However, it will be noted that elements 1, 2, 3, 4, 5, 6, 7, 8, 9, 10, 45, 47 in the above circuit correspond to elements 18, 15, 48, 20, 19, 22, 21, 16, 12, 13, 17, 14 and elements 27, 28, 26, 50, 49, 25, 24, 32, 31, 30, 33, 29 respectively in the remaining circuits.

The control circuit best adapted for use with the circuit of FIG. 1*a* as applied to a spot-welder is represented in the block diagram in FIG. 2. The wave shapes of the various components of FIG. 2 are represented in FIG. 2*b* and will be referred to in the explanation that follows.

The control system of FIG. 2*a* consists of the following component circuits:

(a) A phase shifter which is connected to a reference voltage such as $V_{xy}$ in FIG. 1*c*.

(b) A free running multivibrator of low frequency (20 c.p.s. for example) which is synchronized to the phase $V_{xy}$ by means of the phase shifter.

(c) A timer circuit operated by a switch S and capable of producing a pulse output of variable duration.

(d) Three "AND" circuits.

(e) Three monostable multivibrators.

(f) Two switching circuits.

The operation of the control system of FIG. 2*a* is as follows:

The free running multivibrator is continuously oscillating at a submultiple frequency of the line (20 c.p.s. for example). The timing between the positive pulse of this multivibrator (FIG. 2*b*) and the reference voltage $V_{xy}$ can be varied by means of the synchronizing phase shifter. When the operator closes the switch S a voltage pulse is produced which becomes one of the inputs of a first coincidence or "AND" circuit No. 1. The minimum duration of this pulse is slightly larger than a half cycle of the free running multivibrator. By appropriate adjustments of the timer the duration of this output can be increased so that the new timing periods are always equal to $$\frac{T_f}{2}+\Delta t$$

$$3\frac{T_f}{2}+\Delta t$$

etc., where $T_f$ is the period of the free running multivibrator, FIG. 2*b*. The reason for this relation will become apparent shortly. The second input of the "AND" circuit No. 1 is connected to one of the outputs of the free running multivibrator. When this output becomes positive a coincidence in the input of the "AND" circuit No. 1 occurs and a pulse is delivered from this circuit to the input of the first monostable multivibrator (No. 1). Normally this monostable multivibrator No. 1 remains in its stable position, with an output voltage of very low value. However, when the input of this monostable multivibrator No. 1 is excited by a pulse from the "AND" circuit No. 1, it changes its state (FIG. 2*b*, line 2) for a definite period of time $T_u$, giving an output voltage which is fed to the input of the two other "AND" circuits (Nos. 2 and 3). Since the other input of "AND" circuit No. 2 is already subjected to the output of the free running multivibrator, this circuit will produce an output pulse which is fed to a third monostable multivibrator (No. 3). The two outputs of monostable multivibrator No. 3 are connected respectively to the inputs of two transistors of the switching circuit 2.

When there is no output from "AND" circuit No. 2, monostable multivibrator No. 3 is in its stable position. Consequently in the switching circuit No. 2 the first transistor is off and the second is on. Under these circumstances, the cores of the magnetic amplifiers A, B and C (FIG. 1*a*) must be in their positive state of saturation. Consequently SCR's 1, 18 and 27 cannot fire. When a pulse from "AND" circuit No. 2 is injected in the input of monostable multivibrator No. 3 it will reverse the state of this multivibrator for a definite period of time (FIG. 2*b*) and during this period the first transistor of switching circuit No. 2 will be turned off and the second will be turned on. Cores A, B and C will be driven in a very short time (as compared to the period of the 60 c.p.s.) to their negative state of saturation. SCR's 1, 18 and 27 will then be able to fire.

The action just described occurs just before voltage $V_{xy}$ becomes positive. Thus when $V_{xy}$ reaches a certain value, SCR 1 will fire. The voltage induced from primary 11 to primaries 23 and 34 prevents SCR's 18 and 27 from firing until the line voltages $V_{yz}$ and $V_{zx}$ reach the value corresponding to the commutating angle of a three-phase system. During this sequential firing of SCR's 1, 18 and 27 which takes place within the interval of time $T_2$ (FIG. 2*b*, line 4) the cores of magnetic amplifiers D, E and F are in their positive state of magnetic saturation (towards the dot) and SCR's 2, 15 and 28 will be unable to fire. At the end of time $T_2$, monostable multivibrator No. 3 returns to its table position. The second transistor of switching circuit No. 2 will be turned off and the first will be turned on. Cores A, B and C (FIG. 1*a*) will be driven to their positive state of saturation and consequently the group of SCR's 1, 18 and 27 stop firing.

When the free running multivibrator switches from one state to the next, the following sequence takes place: Monostable multivibrator No. 1 is still in its unstable state (FIG. 2*b*). Consequently the input of "AND" circuit No. 3 receives two coincident signals necessary to produce an output from that circuit. One of the signals comes from the other output of the free running multivibrator and the other from the monostable multivibrator No. 2 which subsequently switches from its stable state to its unstable state. In doing so this monostable multivibrator No. 2 turns on one transistor of the switching circuit No. 1 and turns off the second. Consequently, the cores of magnetic amplifiers D, E and F which were in their positive state of magnetic saturation are forced to go to their negative state of magnetic saturation. This process allows then the SCR's 2, 15 and 28 of the second group of SCR's to start firing when their corresponding line voltages $V_{xy}$, $V_{yz}$ and $V_{zx}$ become positive.

From FIG. 2*b* it is apparent that between the first sequence of firing of SCR's 1, 18 and 27 and the second sequence of firing of SCR's 2, 15 and 28 there is an interval of time $$\frac{T_f}{2}-T_2$$

the purpose of which is to allow the current in the inductive secondary loop of the spot welding transformer (46, FIG. 1*a*) to decay to zero before the second sequence of firing is established. Due to the logical design of the control circuit of my invention (FIG. 2*a*) no matter what the operator does to the starting switch S, the number of cycles in the output of the welding transformer will always be an integral number of cycles. Since the first sequence of firing always starts with SCR 1 and the second sequence terminates with SCR 15 there is no danger of saturating the transformer by starting from a condition of positive magnetic saturation and proceeding in the positive direction towards the saturation region of the core magnetic material.

The power circuit disclosed in FIG. 1*a* may readily be modified for a single phase power supply as shown in FIG. 3*a*. In this circuit the power supply lines $L_1$ and $L_2$ feed the primary of a transformer 61 at the input, the secondary 62 of this transformer being tapped to provide one connection for the load 63, the other side of which is connected in a pair of series circuits 64, 65 with the outer ends of the transformer secondary 62.

In each of these series circuits 64, 65 is interposed an assembly of magnetic amplifiers and rectifiers 51, 52, 53, 54 arranged in the same circuit as is employed in each leg of the circuit of FIG. 1*a*.

Another modification of the circuit of FIG. 1*a* is disclosed in FIG. 4*a*. This circuit like those of FIGS. 1*a* and 2*a* may be driven by a control circuit of the type disclosed in FIG. 2*a*, especially if it is desired to employ it for a spot welder. However, the three power circuits disclosed are also useful for continuous operation as for driving an alternating current motor, or a variable voltage transformer that in turn drives an alternating current motor or other continuous load. In such a case all of the control windings of the magnetic amplifiers may be put into a single series circuit by connecting terminals $S_2$ and $S_3$ (FIG. 1*a*, 3*a* or 4*a*). The remaining control terminals $S_1$ and $S_4$ may then be connected to a simple control circuit of the type shown in FIG. 5. The operation of this type of control circuit may best be explained by considering its function in relation to one of the power circuits disclosed, and that of FIG. 4*a* will serve this purpose satisfactorily.

If terminals $S_2$ and $S_3$ (FIG. 4*a*) are connected, all the control windings (101, 102, 103, 104, 105, 106) of the magnetic amplifiers will be connected in series in such a way that when the windings are energized the magnetic states of cores A, B and C are in opposition to the magnetic states of cores A', B' and C'. When the control windings are de-energized, the resetting of the magnetic cores is done by means of the leakage resistances 109, 110, 111, 114, 117, and 118 in shunt with the blocking diodes 107, 108, 112, 113, 115 and 116. Under the above mentioned conditions, the cores never saturate and the circuit connections between the three-phase lines and the primaries 132, 133 and 134 of the power transformer represent very high impedance paths.

When switch 135 (FIG. 5) is closed, the output of the squarewave generator 125 drives transistor 128 on and transistor 129 off or vice versa, depending on the half cycles of its output signal. When transistor 129 is on and transistor 128 is off, a negative voltage is applied to the series connected control windings 101, 102, 103, 104, 105 and 106. Consequently cores A, B and C are driven to their positive state of magnetic saturation and cores A', B' and C' are driven to their negative state of magnetic saturation (away from the dot). If the voltage applied to the control winding is sufficiently high to reset the cores in a fraction of time of the period of the three-phase line voltages, a counterclockwise sequence of firing will take place.

Assuming that the square-wave generator 125 is synchronized with the line voltage $V_{wy}$, as shown in FIG. 4*c*, the first conduction will take place through diode 107 proceeding then through diode 113 and then through diode 116. Conduction will change from one diode to the other at the commutating angle of the three-phase power line (FIG. 4*c*).

Let us assume that the reversal of the output of the squarewave generator 125 occurs at $t_1$ (FIG. 4*c*) and that due to the inductive reactance of the secondary 135 of the power transformer (FIG. 4*b*) diode 116 conducts 40° in the negative half cycle of $V_{zx}$. The next diode to conduct will be 115. However, due to extended conduction of diode 116 the instantaneous voltage across diode 115 will be negative. Consequently diode 115 will conduct only when the current in the secondary goes through zero (time $t_2$ in FIG. 4*c*).

When a control circuit of the type disclosed in FIG. 5 is employed to control a power circuit such as that of FIG. 1*a*, the operation is as follows: When the output of the oscillator 125 (FIG. 5) is positive, transistor 128 is turned on and transistor 129 is turned off. When transistor 128 is turned on cores A, B and C are driven to their negative state of magnetic saturation while cores D, E and F are driven to their positive state of saturation. Under this condition SCR's 1, 18 and 27 will fire sequentially for a period corresponding to the half period of the oscillator 125 square wave output. When the output of oscillator 125 reverses polarity the opposite effect takes place and SCR's 2, 15 and 28 fire in sequence completing thus a full wave of the output voltage in the secondary 46 of the output transformer. It may be noted that the square wave generator 125 can be a free running multivibrator or any equivalent circuit. In FIG. 5, 130 and 131 are power supplies, and 126 and 127 resistors.

It should be noted further that many minor modifications may be made in the above circuits without departing from the scope of the invention, such as the use of ignitron or thyratron tubes in place of SCR's or the use of Y-connections rather than delta, and so on. Also, two or three systems such as disclosed herein could be put together to drive a two or three phase load instead of a single phase load. Or the core of the transformer of FIGS. 1*b* and 4*b* could as well be the stator core of an electric motor.

I claim:

1. In a frequency converter, conversion means connected between a pair of power lines comprising:
 an induction device having a secondary winding connected to a load and
 a primary winding, said primary winding series connected to a pair of antiparallel connected controllable rectifiers each of which includes a gate electrode and anode and a cathode,
 a pair of magnetic amplifiers each comprising a core, a control winding and a gate winding,
 a first circuit shunt connected across each of said controllable rectifiers and including the gate winding of the associated magnetic amplifier, a limiting resistor and a rectifier,
 a second circuit including a rectifier and connected between the gate electrode of each controllable rectifier and the electrical junction of the limiting resistor and gate winding of each magnetic amplifier, and
 periodic excitation means connected to the control winding of each of said magnetic amplifiers for altering the magnetic state of the magnetic core of said magnetic amplifiers for firing said controllable rectifiers upon an increase of impedance of said gate winding.

2. A device according to claim 1 wherein said conversion means is provided in each leg of a polyphase alternating current power supply.

3. A device according to claim 1 wherein said conversion means is provided in each leg of a three phase delta connected power supply.

4. In a frequency converter, conversion means connected between a pair of power lines comprising:
 an induction device having a secondary winding connected to a load and a primary winding, said primary winding series connected to a pair of antiparallel connected gate windings of a pair of self saturating magnetic amplifiers,
 said magnetic amplifiers each includes a core, a control winding, a gate winding, a blocking rectifier and a leakage resistor shunted across said blocking rectifiers, periodic excitation means connected to said control winding adapted to alter the magnetic state of said core in order to control the impedance of said gate winding for the purpose of controlling the current impulses passing through said gate winding.

5. A device according to claim 4 wherein said conversion means is provided in each leg of a polyphase alternating current power supply.

6. A device according to claim 4 wherein said conversion means is provided in each leg of a three phase delta connected alternating current power supply.

References Cited by the Examiner

UNITED STATES PATENTS

| | | | |
|---|---|---|---|
| 2,322,754 | 6/1943 | Undy | 328—70 |
| 2,721,302 | 10/1955 | Bivens et al. | 321—7 |
| 2,818,505 | 12/1957 | Shepard et al. | 328—70 |
| 2,905,880 | 9/1959 | Hess | 321—66 |
| 2,929,011 | 3/1960 | Parsons | 321—7 |
| 2,998,547 | 8/1961 | Berman | 321—25 |
| 3,175,076 | 3/1965 | Fox et al. | 307—88.5 |

JOHN F. COUCH, *Primary Examiner.*

LLOYD McCOLLUM, *Examiner.*

G. J. BUDOCK, G. GOLDBERG, *Assistant Examiners.*